(12) United States Patent
Oliver

(10) Patent No.: US 9,102,294 B2
(45) Date of Patent: Aug. 11, 2015

(54) REAL-TIME VEHICLE ALARM COMMUNICATION SYSTEM

(71) Applicant: Penny R. Oliver, Torrington, WY (US)

(72) Inventor: Penny R. Oliver, Torrington, WY (US)

(*) Notice: Subject to any disclaimer, the term of this patent is extended or adjusted under 35 U.S.C. 154(b) by 38 days.

(21) Appl. No.: 14/084,712

(22) Filed: Nov. 20, 2013

(65) Prior Publication Data

US 2014/0139331 A1 May 22, 2014

Related U.S. Application Data

(60) Provisional application No. 61/728,445, filed on Nov. 20, 2012.

(51) Int. Cl.
| | |
|---|---|
| *B60R 25/10* | (2013.01) |
| *B60R 25/102* | (2013.01) |
| *B60R 25/04* | (2013.01) |
| *B60R 25/24* | (2013.01) |
| *H04W 4/22* | (2009.01) |
| *H04W 4/02* | (2009.01) |

(52) U.S. Cl.
CPC .............. *B60R 25/102* (2013.01); *B60R 25/04* (2013.01); *B60R 25/24* (2013.01); *B60R 25/10* (2013.01); *H04W 4/02* (2013.01); *H04W 4/22* (2013.01)

(58) Field of Classification Search
CPC ....................................................... B60R 25/10
USPC .................... 340/426.18–426.28; 342/357.07
See application file for complete search history.

(56) References Cited

U.S. PATENT DOCUMENTS

| | | | |
|---|---|---|---|
| 6,956,467 B1* | 10/2005 | Mercado, Jr. .............. | 340/426.2 |
| 7,142,096 B2 | 11/2006 | Eisenman | |
| 7,151,441 B2 | 12/2006 | Chen et al. | |
| 8,531,282 B1* | 9/2013 | Santiago ....................... | 340/436 |
| 2006/0017612 A1* | 1/2006 | Nagatani .................. | 342/357.07 |
| 2006/0176159 A1* | 8/2006 | Chu ......................... | 340/426.19 |
| 2007/0262853 A1 | 11/2007 | Bradus et al. | |
| 2011/0257817 A1* | 10/2011 | Tieman ............................ | 701/2 |

* cited by examiner

*Primary Examiner* — Brent Swarthout
(74) *Attorney, Agent, or Firm* — Daniel Boudwin; Global Intellectual Property Agency LLC

(57) ABSTRACT

A vehicle alarm communication system is provided, comprising a handheld electronic device and a vehicle system that utilizes a global positioning satellite (GPS) network and a cellular network to communicate the status of a parked vehicle. The vehicle system comprises a vehicle alarm that monitors the vehicle status when parked, a processing means, and a pair of antennas for communicating data to the key fob using a cellular network and a GPS network. The location of the vehicle is tracked in real-time via the GPS network for vehicle tracking or vehicle locating, while the cellular network is used to communicate status alerts to the key fob. The alerts communicate possible break-ins, vehicle collisions or similar vehicle alarm system changes in state. The use of dual networks allows the systems to communicate data to the user simultaneously, or in lieu of one another if one network is not available.

2 Claims, 4 Drawing Sheets

REAL-TIME VEHICLE ALARM COMMUNICATION SYSTEM

CROSS REFERENCE TO RELATED APPLICATION

This application claims the benefit of U.S. Provisional Application No. 61/728,445 filed on Nov. 20, 2012. The above identified patent application is herein incorporated by reference in its entirety to provide continuity of disclosure.

BACKGROUND OF THE INVENTION

1. Field of the Invention

The present invention relates to vehicle alarm systems and communication means therewith. More specifically, the present invention pertains to a new key fob and security system for a vehicle in which a user can receive and interpret a security event occurring with the owner's vehicle when the owner is not nearby the same. The owner and user of the key fob can take action to disable the vehicle prior to heading back to the vehicle to inspect the vehicle after the event.

All vehicle owners are aware of the risks of leaving a vehicle unoccupied for long periods of time in a public space. The vehicle is subject to the failings of other drivers, would be thieves, and other members of the public who may not be looking out for the condition of another's vehicle. Because of this all motor vehicles include a locking mechanism to secure the vehicle, and most modern vehicles include some form of security system. Manufacturer-installed and aftermarket security systems monitor certain parameters of the vehicle when parked, locked, and not operating such that an alert is created when the vehicle state changes without authorization. The level of sophistication of these alarm systems varies greatly across the industry and thus varies in effectiveness.

Most commonly available alarm systems monitor the position of the door locks and the ignition state when the vehicle alarm is engaged. More sophisticated systems monitor for changes in momentum of the vehicle and monitor for the sound of broken glass, whereby collisions with the vehicle and window break-ins are respectively monitored. While these alarm systems provide a means to monitor the vehicle, most fail in the means in which the alarm alerts the vehicle owner in the event of an alarm trigger. Most alarms initiate an audible alarm signal from the parked vehicle when the alarm is triggered, which is audible within a given range and used for the purposes of drawing attention to a would-be thief or a vehicle collision. This form of notice is useful for employing public awareness to deter break-ins in the open; however, they fail to alert the vehicle owner when not in audible range of the vehicle.

Vehicle owners are most concerned with three major types of events related to an unoccupied vehicle: vehicle theft, vehicle vandalism, and collisions with other objects or motorists while parked (i.e. shopping carts, door dings, and vehicle collisions). The present invention contemplates a new and novel system that utilizes modern communications networks to provide a user with a means of monitoring the status of a parked vehicle when the vehicle is left unoccupied and the user is not in audible or visual range. The present invention is a system that utilizes existing vehicle alarm technology (door lock position, vehicle ignition status, motion monitoring, broken glass monitoring, etc.) and provides a dual network means of communication with a distant user. Notably, the system employs both a GPS antenna and a cellular antenna for communicating with the user across the two respective networks. Specifically, the system provides a communications means using a given protocol, which sends signals between the vehicle and the user using a digital signal via telecommunications (cellular) network and a space-based satellite navigation system (GPS).

2. Description of the Prior Art

Devices have been disclosed in the prior art that relate to vehicle alarms and means of communicating a vehicle alarm state to a distant vehicle owner. These include devices that have been patented and published in patent application publications, and generally relate to a GPS based system or a cellular based system, wherein the drawbacks of both are incorporated into the system. The present invention utilizes both systems such that the vehicle owner is ensured connection with the vehicle alarm system independent of the vehicle location (except for rare instances), wherein the capabilities of the two networks are used in conjunction and their overlapping coverage is capitalized upon. The GPS network is used in more open, rural areas, while the cellular network is used in more populated and covered areas. The following is a list of devices deemed most relevant to the present disclosure, which are herein described for the purposes of highlighting and differentiating the unique aspects of the present invention, and further highlighting the drawbacks existing in the prior art.

One such device in the prior art is U.S. Pat. No. 7,151,441 to Chen, which discloses a vehicle burglar alarm system that utilizes global positioning system (GPS) technology to recognize when the vehicle alarm has been triggered or when an abnormal status event has occurred. The system utilizes a first and second flag to track the location of a vehicle by GPS even when the vehicle is parked in a location without a GPS signal (i.e. in an underground or covered garage). When the system recognizes the GPS signal is no longer available, the position of the vehicle is registered. If the alarm is triggered and the GPS system detects a signal once more, the system determines that the vehicle is being moved without authorization and alerts the owner. The Chen system, while providing a means of tracking a vehicle that is integrated into an alarm system, fails to anticipate the use of a cellular network communications protocol to continually communicate with an alarm system key fob carried by the user.

U.S. Pat. No. 7,142,096 to Eisenman discloses an improved GPS device having a radio transmitter portion for both opening and locking a vehicle, and further for triggering a car alarm using the GPS network. The device comprises a housing that resembles a key fob, wherein a GPS antenna is disposed within the device and coordinates with the security system of the vehicle. The normal radio control functions of the key fob remain the same as those present in the art, however the GPS capability allows the security system to be triggered or interacted with at great distances from the vehicle. The Eisenman device is very similar in concept to the present invention; however the present invention contemplates the use of a cellular network. A cellular network is functional in covered parking areas such as garages and in metropolitan areas, whereas a GPS system relies on line of sight with a GPS satellite for functionality. The Eisenman device is more suited for open spaces and in more rural areas, while the present invention is more suited for populated areas where car theft may be a more prominent problem.

Similar to the Eisenman device is U.S. Patent Publication No. 2006/0176159 to Chu, which discloses a wireless vehicle alarm system that utilizes a GPS network to provide inputs to a remote vehicle owner and to record the current position of the vehicle. As with Eisenman, the Chu device is not well suited for urban areas or for those times in which a vehicle is parked in a sheltered location. The present invention is presented as an alternative a system such as this, wherein line of sight to a GPS satellite is not required for proper operation. Specifically, a cellular network is utilizes to communicate occurrences between a vehicle and a distance owner.

U.S. Pat. No. 6,956,467 to Mercado, Jr. discloses a vehicle alarm that comprises a main controller for deciphering a plurality of inputs from the vehicle and from the vehicle alarm system. A communication means is provided that includes an automatic dialer, wherein a phone call is made to a wireless device on a key fob. A transceiver on the key fob allows a vehicle owner to recognize an event with respect to the vehicle alarm and to take action in the form of sounding the audible annunciator of the vehicle alarm. The Mercado, Jr. device further includes a means to disable the vehicle by applying the brakes or shutting down the fuel pump relay of the vehicle. The Mercado, Jr. device, while providing an automatic dialer, fails to provide the dual network capability provided herein.

Finally, U.S. Patent Publication No. 2007/0262853 to Bradus discloses a vehicle alarm that includes a sensor module configured to monitor the status of a vehicle, wherein the sensor module provides a notification via a notification module to a user using either a wired or wireless communication means. The present invention relates to a system utilizing a first and second wireless network that switches between the networks when one is unavailable when contacting the vehicle owner. A vehicle alarm event is communicated via a cellular network and tracks the vehicle therewith, while the GPS network is utilized when the cellular network is unavailable.

Overall, the present invention provides a means of tracking a vehicle (in the event of theft or for relocation of the same in a parking lot) and a means of communicating the state of a vehicle alarm to a distant user using a first and second network that communicates to a handheld key fob device. It is submitted that the present invention substantially diverges in design elements from the prior art, and consequently it is clear that there is a need in the art for an improvement to existing vehicle alarm communication systems. In this regard the instant invention substantially fulfills these needs.

SUMMARY OF THE INVENTION

In view of the foregoing disadvantages inherent in the known types of vehicle alarm communication systems now present in the prior art, the present invention provides a new system that can be utilized for providing convenience for the user when monitoring the status of a parked vehicle from a remote location and taking measures to deactivate the vehicle in the event of a break-in or vehicle theft.

It is therefore an object of the present invention to provide a new and improved vehicle alarm communication system that has all of the advantages of the prior art and none of the disadvantages.

It is another object of the present invention to provide a vehicle alarm communication system that utilizes a standard vehicle alarm system and includes a control unit adapted to receive signals from the alarm system and send signals to the user via a first and second network.

Another object of the present invention is to provide a vehicle alarm communication system that contemplates a user-carried key fob that can receive and send signals via a first and second wireless network related monitoring and controlling the state of a vehicle and the vehicle alarm.

Yet another object of the present invention is to provide a vehicle alarm communication system that utilizes a GPS network and a cellular network to allow distant monitoring of a vehicle alarm status, the vehicle position, and control over the vehicle ignition.

Another object of the present invention is to provide a vehicle alarm communication system that can operate equally in rural, open locations and in more populated and covered areas.

Another object of the present invention is to provide a vehicle alarm communication system that allows the user to control the operation of the vehicle from afar, along with the normal key fob parameters customarily provided thereon.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
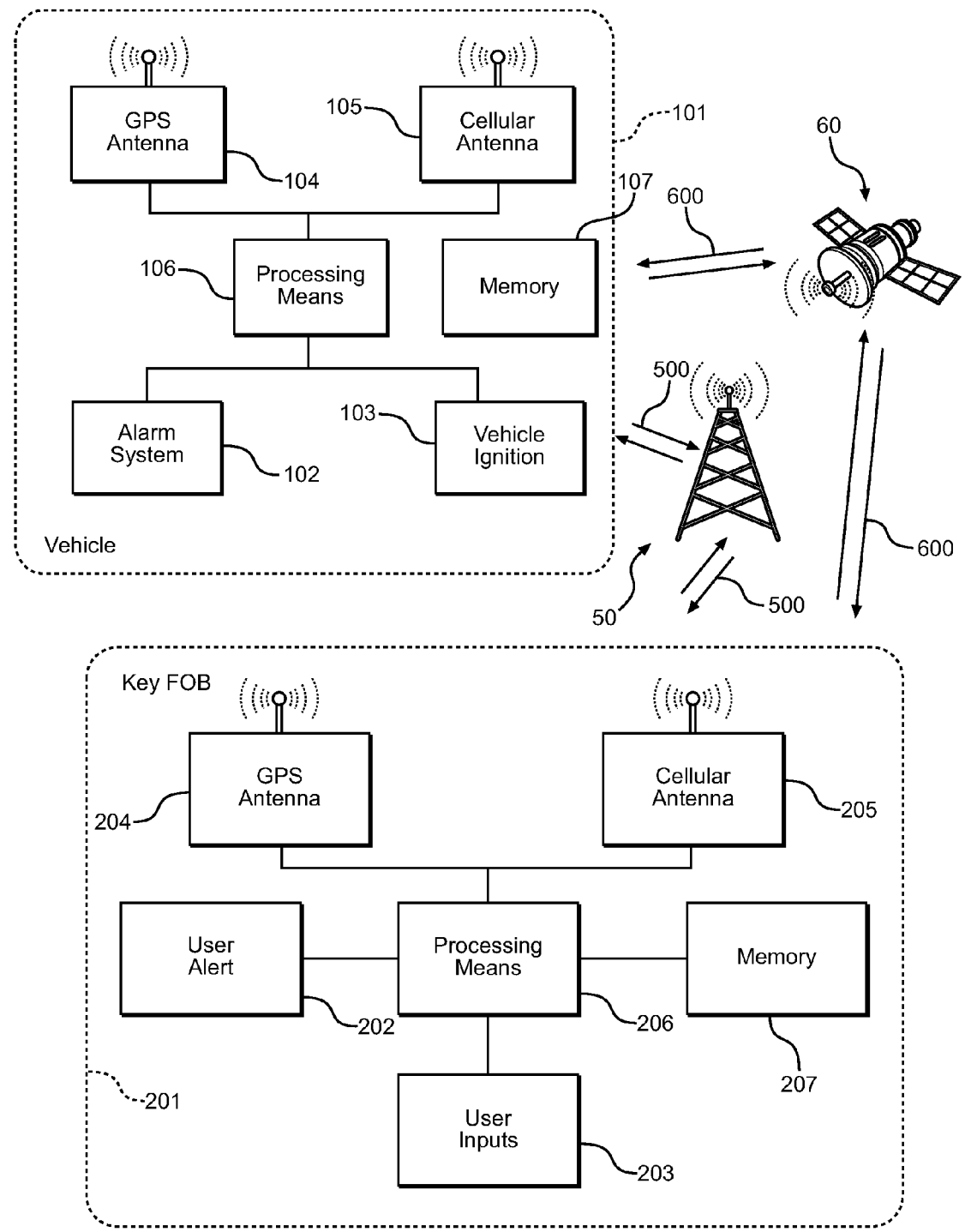
FIG. 1 shows the system elements of the vehicle system and the key fob assembly, along with the communications networks utilized therebetween.

Reference is made herein to the attached drawings. Like reference numerals are used throughout the drawings to depict like or similar elements of the vehicle alarm communication system. For the purposes of presenting a brief and clear description of the present invention, the preferred embodiment will be discussed as used for monitoring a parked vehicle from beyond visual or audible distances, tracking the same, and disabling the vehicle if necessary. The figures are intended for representative purposes only and should not be considered to be limiting in any respect.

Referring now to FIG. 1, there is shown a view of the system elements of the present invention. The overall system includes a vehicle system 101 installed on the user's vehicle, and a key fob system 201 carried by the user. The vehicle system 101 comprises a vehicle alarm 102, a system processing means 106, a vehicle disabling means 103, a memory, and a GPS 104 and cellular network 105 antenna to transmit and receive signals to and from the key fob 201 held by the user. The vehicle alarm 102 monitors one or more parameters of the vehicle when activated and the vehicle is left unaccompanied, including the door lock position, motion of the vehicle, window glass breakage, and ignition position. This alarm 102 may be a manufacturer installed system or one specifically suited for use with processing means 106 of the present invention. The processing means 106 is connected to the vehicle alarm 102 and interprets signals therefrom. The processing means 106 coordinates and controls the communications between the user-held key fob 201 based on the interpreted signals of the vehicle alarm system and allows the user to track, locate, and disable the vehicle using the key fob.

The processing means 106 of the vehicle system 101 comprises a microprocessor or similar digital processor that is programmed to coordinate with vehicle alarm system triggers and send notifications to the user that a trigger event has occurred. The processor includes a memory 107 for temporarily storing information (non-transitory computer readable medium, etc.). The processor sends data through the cellular network 50 and the GPS network 60 such that the user is apprised of the vehicle status at a distant location. The system determines the most optimum network to utilize at the given time based on signal strength, and utilizes either the land based cellular network 50 or the satellite based GPS network 60. Wireless cellular signals 500 are sent to and from land based radio towers via the vehicle system cellular antenna 105, wherein likewise satellite signals 600 are sent to orbiting satellites 60 via the vehicle system GPS antenna 104.

Cellular 500 and/or GPS 600 signals are transmitted to the respective cellular 205 and GPS 204 antennas of the user-held key fob 201 for processing. The key fob is an electronic handheld device that includes a processing means 206 of its own, which interprets the GPS and cellular signals via onboard programming stored in memory 207. The signals are then communicated to the user via a user alert means 202. The user alert means 202 comprises a physical means of alerting the user of a vehicle event, such as activating a vibratory mechanism in the key fob, energizing an audible or visual alarm signal, or initiating a similar alarm that the user can recognize. The user can then take action if required, including the option of deactivating the vehicle using the inputs 203 of the key fob. The user's inputs are then sent back through the given network for the vehicle system to carry out the user's intended instructions.

Figure 2:
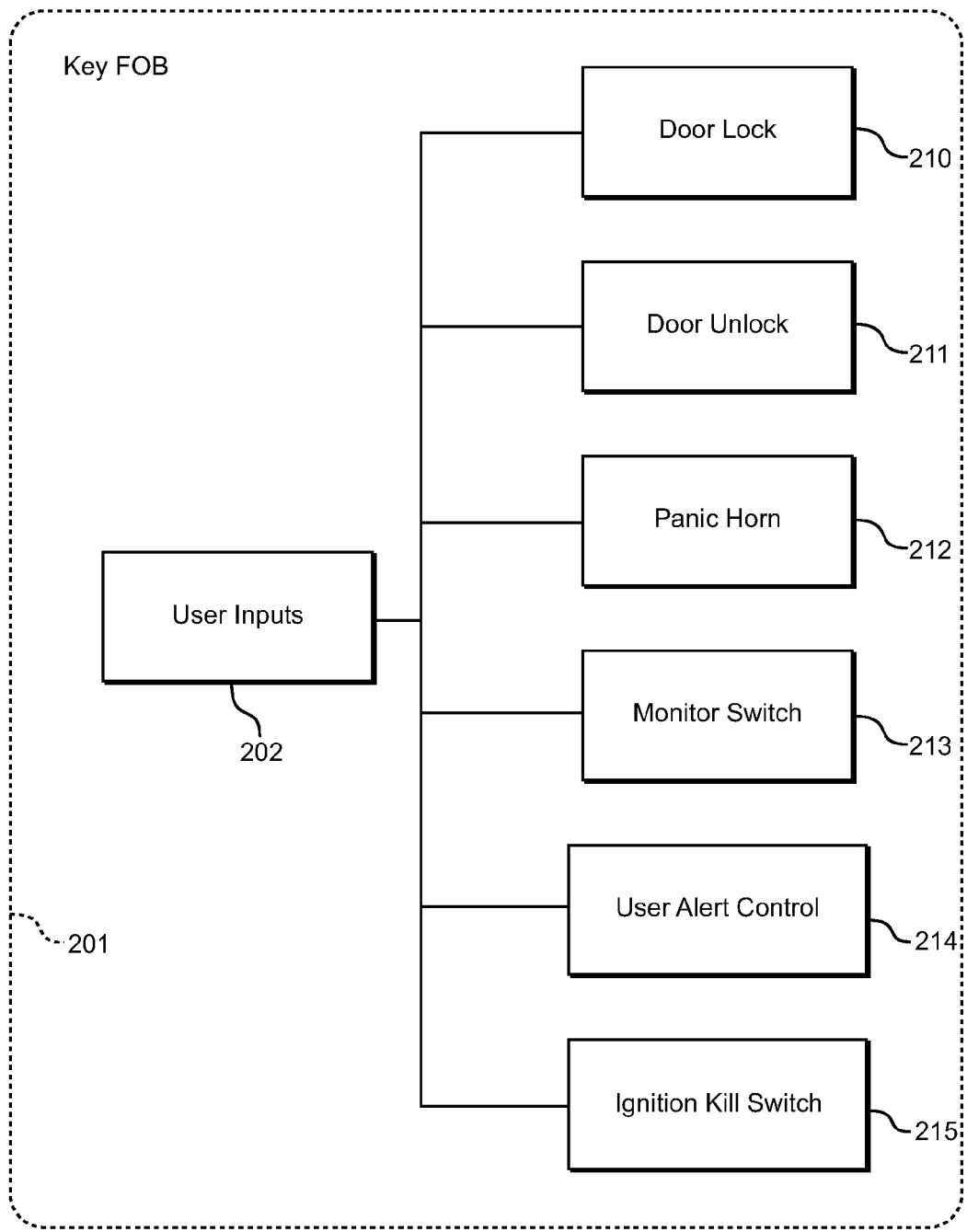
FIG. 2 shows the user inputs on the key fob assembly.

Referring now to FIG. 2, there is shown a series of contemplated user inputs 202 provided to the user on the key fob 201. It is desired that the key fob of the present invention will operate as a traditional means of opening 211, locking 210, and alarming a vehicle, wherein buttons are provided thereon for facilitating this action at a given range, or a keyless entry wireless communications means is provided therein for keyless entry. However, the key fob of the present invention further contemplates actions that are generally beyond the normal operating range of most vehicle key fobs. These include interacting with the vehicle alarm system during a trigger event, locating the vehicle after an event or in the event the user cannot remember its location, and further for disabling the ignition system of the vehicle.

It is contemplated that along with a door lock 210, unlock 211, and panic button 212, the key fob also comprises a monitor operation switch 213, a user alert control 214, and a vehicle ignition kill switch 215. The monitor switch 213 allows the user to locate the vehicle using the GPS system, wherein a visual readout of its location may be provided or may be sent to a paired mobile device. The monitor switch 213 further controls the user alert operation of the key fob, wherein certain situation the user may not wish to monitor the condition of the vehicle alarm (i.e. in the owner's own home, when being serviced, etc.). Likewise the user alert control 214 allows the user to control the type of signal created during an alert (i.e. vibratory signal, visual signal, audible signal, or no action). For each type of alert, a corresponding internal assembly is required, such as a vibratory mechanism, an electric circuit and light source, a sound generator and microphone, etc.

The final user input 202 on the key fob 201 is the ignition kill switch 215. This input allows the user to deactivate or disable the ignition system of fuel system of the vehicle such that it cannot readily start. The signal is sent from the key fob and to the vehicle processing means, which in turn communicates with the vehicle. The system includes a specific means of deactivating the vehicle, such as decoupling the ignition switch from the vehicle such that the vehicle registers the key being decoupled from the ignition. Alternatively the spark plugs or injection system may be controlled using the vehicle's onboard electronics, or further the fuel pump may be decoupled from the vehicle engine. The goal is to provide a vehicle owner with a means to prevent theft of the vehicle using the vehicle's own power.

Figure 3:
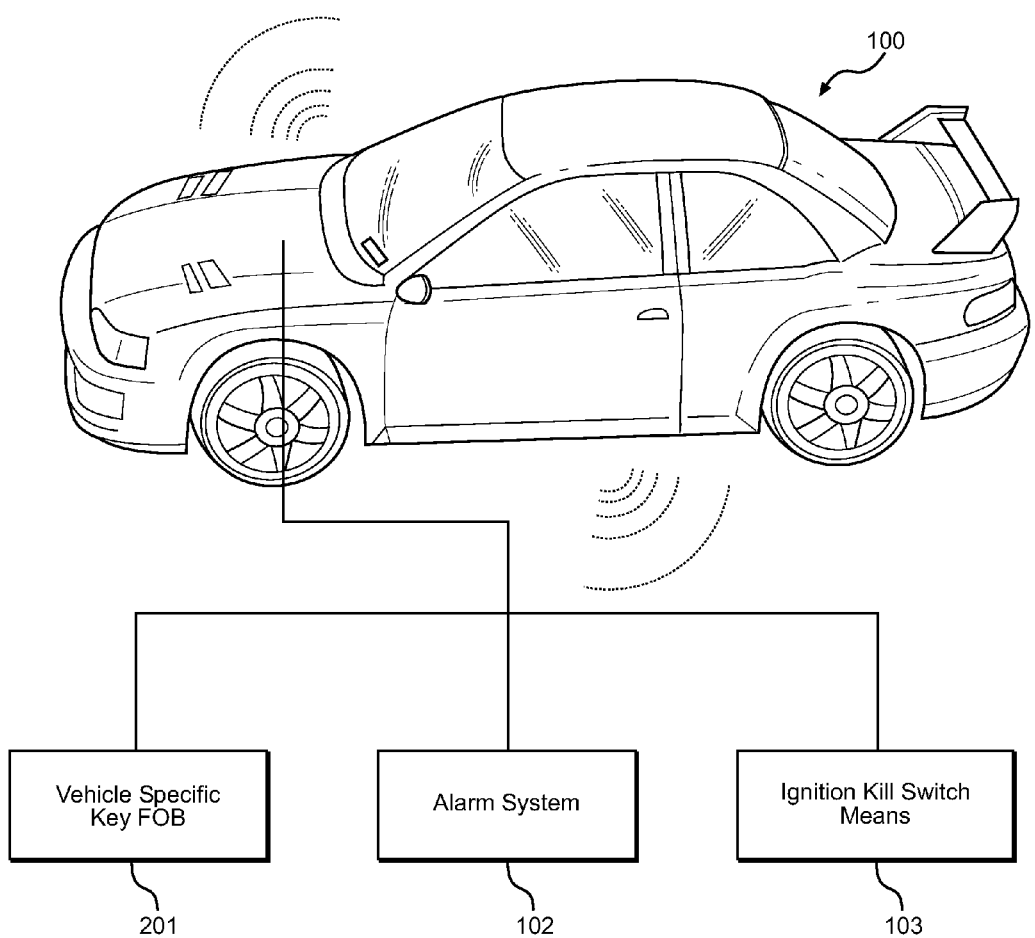
FIG. 3 shows the system elements of the vehicle.

Referring now to FIG. 3, there is shown a diagram of the system elements of the user's vehicle 100. The system operates using a first and second wireless network (GPS and cellular networks); however the system is also electrically connected to the vehicle alarm system 102, includes a vehicle disabling means 103, and includes a vehicle specific key fob 201 that the user can utilize to monitor and interact with the vehicle alarm system 102 and the ignition disabling means 103.

During an alarm trigger event, the processing means of the vehicle utilizes the GPS network of the cellular network to communicate the status of the vehicle with the user's key fob. If the vehicle is parked underground or in a garage, the cellular network can be utilized. If the vehicle is in a rural area without available cellular network coverage, the GPS network can be utilized. It is contemplated that the processing means can discriminate between the systems based on their relative signal strengths and use that network that is most readily available, or the default network if both are functioning at full signal strength.

Signals being communicated across the wireless networks include a notification of an alarm trigger, the type of trigger event if applicable (i.e. door unlock, interior motion sensor, window breakage, etc.), the vehicle location, and signals from the user to disable the vehicle or deactivate the alarm if desired. If the vehicle location is desired, the cellular network can be utilized using multilateration of radio signals between a plurality of radio towers of the cellular network and the vehicle cellular antenna location. If the cellular network is unavailable, exact coordinates can be transmitted using the GPS antenna and network.

Figure 4:
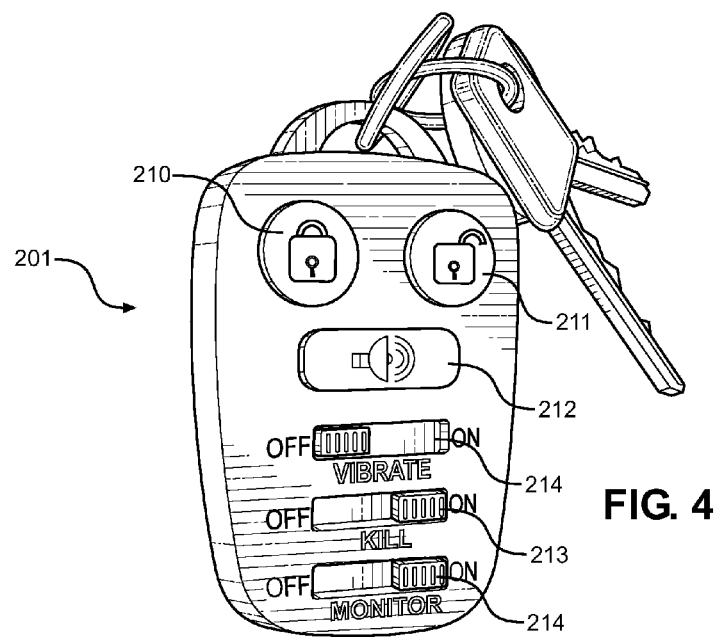
FIG. 4 shows an exemplary embodiment of the key fob of the present invention.

Referring now to FIG. 4, there is shown an illustrative example of the key fob 201 of the present invention. The key fob 201 is a handheld or pocket held assembly that includes an internal processing means and antennae for receiving and transmitting across the GPS and cellular network. Because of this, the key fob 201 is generally larger than most common key fob devices; however it incorporates user inputs that allow for the vehicle owner to be aware of his or her vehicle status and location, and further provides the ability to take action to disable the vehicle or deactivate an alarm signal. At a minimum the key fob includes a door lock 210, unlock 211, and panic button 212 presently found on most key fobs in the marketplace. The key fob 201 preferably also incorporates a user alert controller 214, a monitor switch 213, and a vehicle disabling control means 215. These inputs allow the user to control the type of output from the key fob in the event of a trigger event, to enable or disable the vehicle alarm or the monitoring activity, and the disable the vehicle, respectively.

In one embodiment, the key fob 201 of the present invention is a cellular phone handheld electronic device (e.g. a smartphone) running an application that facilitates the aforementioned functions. This allows the user to simply carry a smartphone that is programmed to operate in conjunction with the user's vehicle. The smartphone is used to visualize the vehicle location, to communicate the user's inputs, the lock and unlock the vehicle, and facilitate the vehicle operation as if the smartphone were a wireless key as provided in vehicle keyless entry systems. As an alternative to this embodiment, the key fob 201 of the present invention may be paired to a user's smartphone using a short range wireless signal (e.g. Bluetooth), wherein the user's vehicle can be located on a digital map thereon.

Figure 5:
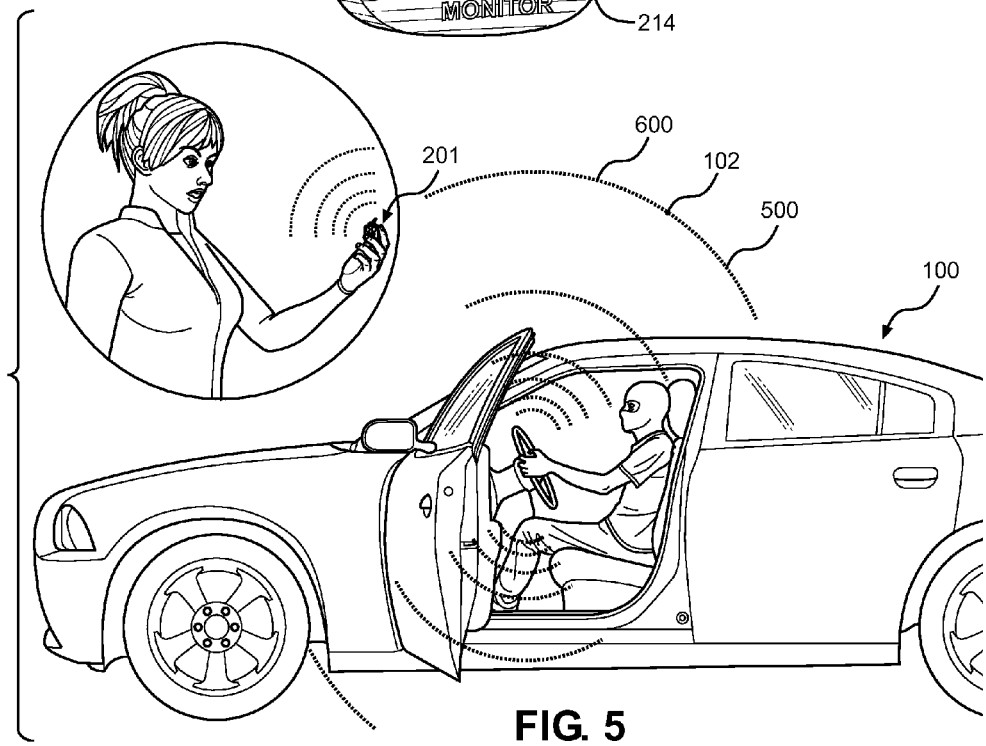
FIG. 5 shows an illustrative view of the system in operation.

Referring finally to FIG. 5, the vehicle alarm communication system of the present invention is illustratively demonstrated, wherein the key fob 201 is alerting a user via cellular 600 and/or GPS 500 signals of a vehicle trigger event. The alarm 102 of the vehicle 100 is activated, whereafter the user is alerted via the key fob 201 or smartphone device. The user can then take action to alert authorities, cease the alarm (during a false alarm), disable the vehicle, and/or track the vehicle if the vehicle is being moved.

Automobile theft is an ongoing problem. Many people lock their doors when they are not inside their vehicle. This simple action, however, may not deter criminals from breaking into the vehicle and trying to drive off with it. If people are away from their vehicle for an extended period of time, they may not realize someone broke in and may not be able to report the crime in a timely manner. The present invention describes a vehicle alarm communication system. The system comprises a remote key fob that wirelessly communicates with an anti-theft car alarm system. The alarm system utilizes a GPS network and a cellular network for detecting the position of the vehicle and for communicating the status of the alarm system to the user. If the vehicle is inadvertently moved by a thief, the alarm sounds, and the wireless key fob user alert is activated. The GPS or cellular network can be used to track the location of the vehicle, wherein further the user can disable the vehicle such that it cannot be driven away. This instantly notifies a vehicle owner if another tries to break into their parked vehicle, allows users to quickly disengage their parked vehicle to prevent perpetrators from driving off with it, and enables people to report hit-and-run accidents or report the time of attempted car thefts to help police catch the perpetrator. As disclosed, the system operates using a sophisticated key fob assembly alone, in conjunction with a smartphone, or alternatively using only a smartphone. If the key fob alone is utilized, it is contemplated that a display screen may be included thereon to locate the vehicle using a digital map.

It is submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vehicle alarm communication system, comprising:
a vehicle alarm system for monitoring at least one alarm parameter of the vehicle when armed, the vehicle alarm system further comprising a vehicle alarm alert;
a handheld electronic device;
a vehicle system, comprising:
    a processor electrically connected to said vehicle alarm system;
    a memory;
    a vehicle-mounted cellular wireless network antenna adapted to transmit and receive signals between the vehicle system and the handheld electronic device over a cellular wireless network;
    a vehicle-mounted global positioning system antenna adapted to transmit and receive location signals between the vehicle system and a global positioning system network for determining a location of the vehicle system;
    a vehicle disabling means;
the handheld electronic device, further comprising:
    a processor;
    a memory;
    user input interface;
    user alert means;
    a cellular wireless network antenna adapted to transmit and receive signals between the vehicle system and the handheld electronic device;
wherein the vehicle system is adapted to transmit a notification signal to the handheld electronic device when vehicle alarm system is activated based on the at least one alarm parameter;
wherein the handheld electronic device comprises a fob;
the fob further comprising a short range wireless antenna adapted to transmit and receive signals between the fob and a second handheld electronic device having a display;
wherein the second handheld electronic device is adapted to show the notification signal, indicate the at least one parameter that has activated, and show the vehicle system location using the location signals from the vehicle system;
wherein the fob is adapted to allow a user to engage the vehicle disabling means and activate or deactivate the vehicle alarm alert of the vehicle alarm system.

2. The vehicle alarm communication system of claim 1, wherein:
said second handheld electronic device comprises a smartphone device.

* * * * *